United States Patent [19]

Slocombe

[11] 4,414,354

[45] Nov. 8, 1983

[54] AQUEOUS POLYMERIC LATEX COATING COMPOSITIONS, PRODUCTS PRODUCED THEREBY, METHODS FOR PREPARING SUCH COMPOSITIONS, AND METHODS FOR USING SUCH COMPOSITIONS

[75] Inventor: Robert J. Slocombe, University City, Mo.

[73] Assignee: Monsanto Company, St. Louis, Mo.

[21] Appl. No.: 364,703

[22] Filed: Apr. 2, 1982

Related U.S. Application Data

[62] Division of Ser. No. 807,267, Jun. 16, 1977, Pat. No. 4,374,670.

[51] Int. Cl.$^3$ .............................................. C08L 33/02
[52] U.S. Cl. ................................... 524/460; 524/356; 252/322; 204/159.16
[58] Field of Search .......................... 524/460, 81, 356; 204/159.16; 252/322

[56] References Cited

U.S. PATENT DOCUMENTS 3,754,054  8/1973  Kimura et al. ...................... 526/518
3,926,755 12/1975  Marans et al. .................. 204/159.15

*Primary Examiner*—John Kight, III
*Assistant Examiner*—Amelia B. Yarbrough
*Attorney, Agent, or Firm*—Sughrue, Mion, Zinn, Macpeak and Seas

[57] ABSTRACT

The invention concerns compositions for producing adherent polymeric coatings on a variety of substrates. The coating compositions comprise polymeric latices of colloidal polymer particles of at least one polymer capable of being deposited in the form of a film. In addition to the film-forming polymer, the coating composition comprises a discrete latex component which is a precursor of a material aiding rapid film formation through inter-reaction with the polymer particles, and may also have an affinity toward the substrate so as to function as a linking agent. This material can cause film formation by disrupting the colloidal stability of the polymer particles. It is possible to select as the discrete latex component a precursor of a material which has the dual function of increasing speed of film formation while fostering the adherence and bonding of the film to the substrate because of the material's relative affinities for the polymer and for the substrate.

35 Claims, No Drawings

AQUEOUS POLYMERIC LATEX COATING COMPOSITIONS, PRODUCTS PRODUCED THEREBY, METHODS FOR PREPARING SUCH COMPOSITIONS, AND METHODS FOR USING SUCH COMPOSITIONS

CROSS REFERENCE TO RELATED APPLICATIONS

This application is a divisional of copending application Ser. No. 807,267, filed June 16, 1977, now U.S. Pat. No. 4,374,670.

BACKGROUND OF THE INVENTION

While the present invention has broad application in the field of aqueous polymeric coating compositions and their preparation and use, the impetus for the invention's development arose from a desire to provide superior vehicles for printing inks. Due to the recognition in recent years of serious enviromental problems associated with organic solvent-based inks, attention has been directed to the development of organic solventless inks, including aqueous inks.

As the result of such research, two general types of solventless ink systems have been introduced commercially —i.e., catalytic and UV curing inks. The catalytic inks comprise liquid prepolymers and a stabilizer. After printing, the printed material is heated to a temperature at which the stabilizer decomposes, allowing the prepolymers to crosslink, forming a film of dry, thermosetting resin. The UV curing inks comprise liquid photopolymers and initiators which release free radicals upon irradiation by UV light. The free radicals initiate polymerization of the photopolymer to a solid film of dry thermosetting resin.

The foregoing solventless ink systems have certain limitations in terms of quality of print, speed of setting and smoothness and adherence of the resulting film. Particular shortcomings of such inks and ink systems, in general, have been the extreme toxicity of certain materials found in the UV systems and lack of stability of the catalyzed inks. Attempts to use water as the ink solvent have resulted in lack of adhesion to certain polar substrates, such as polyolefins—e.g., corona discharge-treated polyethylene which is widely used, e.g., in packaging and which has proved to be quite difficult to print because of poor adhesion of inks. One approach to a water-based ink is disclosed in commonly-assigned, copending application Ser. No. 687,413, filed May 17, 1976, now U.S. Pat. No. 4,072,644, by Hedrick, disclosing aqueous-based printing inks utilizing a polymer solubilized in the ink by a rapid removable solubilizing component, the polymer being capable of forming a water-insensitive gel film upon removal of the rapid removable solubilizing component.

Therefore, I set about to design improved organic solventless, aqueous polymer latex coating compositions and, particularly, such compositions which would be useful as vehicles for ink compositions capable of producing quick-setting, smooth and adherent films when printed on a variety of substrates, including difficult-to-print substrates, such as corona discharge-treated polyethylene or the like. Although my invention as hereinafter described enables one to produce smooth, adherent coatings from aqueous latex systems, it will be apparent that the underlying principles are also applicable to latex-type formulations based on organic solvent systems, such as organosols, as long as the discrete polymer particles can be suspended therein and the second descrete component can be added in a compatible manner.

DESCRIPTION OF THE PRIOR ART

I am not aware of any aqueous polymer latex coating composition which is conceptually similar to the present invention. As noted above, UV curable inks have been introduced which accomplish setting of a liquid photopolymer by exposing a coating containing such a polymer and an initiator to UV irradiation so that free radicals from the initiator react with the liquid photopolymer, causing it to be cross-linked and solidified.

UV curable polymer solutions containing cross-linking agents including small amounts of amines are described in U.S. Pat. No. 3,754,054, issued Aug. 21, 1973, to Kimura, et al. The use of amines in the polymerization of radiation-curable vinyl ester resins is set forth in U.S. Pat. No. 3,901,779, issued Aug. 26, 1975, to Mani.

In U.S. Pat. No. 2,776,918, issued Jan. 8, 1957, to Bersworth, a method is described for improving adhesion of coatings to a substrate such as metal or glass by using an intermediate chelate-containing coating to prepare the substrate.

U.S. Pat. No. 3,829,324, issued Aug. 13, 1974, to Blais, discloses the production of adherent polymeric coatings to electric discharge-treated polymer substrates by coating the substrate with monomers capable of forming a condensation polymer and then polymerizing the polymer in situ.

Radiation-curable polyester compositions comprising a mixture of polyester and certain specified amines are taught in U.S. Pat. No. 3,926,755, issued Dec. 16, 1975, to Marans.

Water-based polymeric inks are described in U.S. Pat. No. 3,991,032. The inks comprise a solution of salts of certain copolymers in a water/diol solution which, upon drying, becomes irreversibly impervious to water.

In none of the foregoing disclosures is there proposed a coating system as described herein, including the concept of a precursor component of a material to disrupt colloidal stability and a convenient means to convert the component to the disruptive material. Moreover, the aforementioned disclosures do not propose the presence of a precursor of a material capable of bonding latex polymer particles to a substrate through electron attraction and/or repellence to provide a quickly-set, smooth and adherent film. In accordance with the present invention, in addition to providing polymer coating compositions which have a wide range of utilities and which are suitable for coating on most common substrate materials, there is provided a unique coating system which permits quick coagulation of the polymer and thereby overcomes a syneresis problems. Syneresis results in striated coatings and often occurs when latex coatings dry on non-absorbent substrates, such as would occur on a polyolefin film.

SUMMARY OF THE INVENTION

The compositions of the present invention comprise polymeric latices, generally of high solids content, of colloidal polymer particles of at least one polymer capable of being deposited in the form of a film. In addition to the polymer, the coating composition comprises a discrete latex component which is a precursor of a material causing rapid film formation through inter-reaction with the polymer particles and which may also have an affinity toward the substrate so as to function as a bonding or linking agent. It is possible to select as the discrete latex component a precursor of a material which has the dual function of increasing speed of film formation while fostering the adherence and bonding of the film to the substrate because of the material's relative affinities for the polymer and for the substrate.

In a preferred embodiment, the compositions of the present invention generally comprise an aqueous polymer latex, the colloidal polymer particles of which are charged, and a precursor of a polyelectrolyte of opposite charge. The polyelectrolyte is capable of forming ionic bonds with functional groups on the polymer and also is capable of forming ionic bonds with oppositely-charged functional groups available on a substrate surface onto which the composition is coated. In a second preferred embodiment, the precursor component forms a substantially non-ionic material capable of bonding to functional groups on the polymer and also on the substrate through hydrogen bonds. The polyelectrolyte or non-ionic material may be generated in situ in response to irradiation—e.g., by actinic light, electron beam, infrared, etc., and/or by heat. An aqueous polymer latex suitable for use in the invention may be produced, for example, by emulsion polymerization of monomers to produce colloidal polymer particles having acidic or basic functionality. If the polymer is acidic, the polyelectrolyte precursor chosen will be basic and the non-ionic material will be capable of hydrogen bonding to acidic functions, and vice versa. Likewise, if the polymer is acidic, the composition will preferably be coated on an acid-bearing—i.e., similarly-charged—substrate, and if basic, then on a basically-charged substrate.

While useful to coat any type of substrate in the preferred embodiments, the compositions are especially useful for coating non-absorbent polymeric substrates which are provided with functional groups attracted to functional groups of the non-ionic or polyelectrolyte material.

DETAILED DESCRIPTION OF THE INVENTION

The present invention will be described with respect to compositions comprising an aqueous polymer latex. The latex polymer is one which forms a coating upon removal of the water, and it is present in the latex in the form of colloidal polymer particles. Although thus described, organic colloids—i.e., organosols—are contemplated and can realize the benefits of the present invention. As a second necessary component, the coating composition of this invention contains a precursor of a material which aids in the formation of an adherent film where such a film is not normally formed or is not usually formed within a short time period. Quite often, there is insufficient attraction or affinity between the polymer particles and the selected substrate to form a relatively uniform, adherent polymer film. The present invention overcomes this deficiency through the presence of the precursor component described in detail hereinbelow.

In preferred embodiments, the component performs two functions. Once these are understood, it is apparent that components are operable which only perform one of the two functions, with a possible reduction in results, depending upon particular use of the coating composition, substrate involved, etc. Indeed, the same component can perform one or both functions, depending upon the environment of use. Thus, in the preferred embodiments, the component is a precursor of a material causing rapid polymer film formation—i.e., through a phase disruption and separation mechanism which would involve a type of increased insolubilization, coagulation and/or precipitation action on the latex polymer—and at the same time increasing the attraction of the polymer to the substrate through a type of linking mechanism. Regarding the second, above-noted function of increasing attraction, the material formed from the precursor will be characterized by a greater relative affinity for the polymer than the affinity of the polymer for the substrate, and also by a greater relative affinity for the substrate than the affinity of the polymer for the substrate.

From the above, it should be understood that materials formed from components which substantially only cause rapid colloidal phase disruption and separation of the polymer are useful while the preferred material formed from precursor components will also act as linking agent between polymer and substrate.

Many different types of precursors are useful as components in the present invention. The type of material aiding film formation could be selected from precursors of materials which, in some manner disrupt the colloidal stability of the polymer particles to cause them to come out of the colloidal phase into an aggregate, precipitate or the like. The particular mechanism is unimportant as long as the precursor for the colloidal phase disrupting material is compatible with the overall coating composition. This material can function as a coagulant, precipitant, gelling agent or the like, or as a combination thereof.

The linking-type material is also formed from a precursor and can increase the relative attraction of the polymer to the substrate in a number of different ways. As non-limiting examples, ionic bonding, hydrogen bonding, electron transferal and the like, or combinations thereof, can be used to increase the adherence and bonding of the polymer to the substrate.

One type of material formed from the precursor is a polyelectrolyte polymer that develops a plurality of either positive or negative charges along its backbone when in contact with aqueous media of acidic or basic or neutral pH. A polyelectrolyte is considered to be an ionic material. Another type of material formed from the precursor is essentially non-ionic in nature, but contains groups along its backbone which polarize to form dipoles. These dipole-forming groups usually contain moieties which can act as electron acceptors and as electron donors. These areas of partial charging can inter-react with oppositely-charged areas of the polymer particles and of the substrate to disrupt colloidal stability and/or bond or link the polymer particles to the substrate through weak electrostatic bonds. Where hydrogen atoms are involved, since hydrogen has only two electrons, an electronegative-group can approach very closely to the hydrogen atom to form a weak electrostatic bond known as a hydrogen bond. As another example of the type of bonding or linking with non-ionic materials, there may be mentioned the electron attraction between materials which can function as Lewis bases and materials which can function as Lewis acids. Often, hydrogen bonding would be involved but need not be involved when Lewis acids and bases are defined only in the sense of electron donating or electron accepting.

In one preferred embodiment of the present invention, a preferred mode would be where the latex comprises colloidal particles which are charged; and as the second component, there is present in the coating composition a precursor capable of forming a polyelectrolyte oppositely charged with respect to the charge on the polymer particles and capable of forming ionic bonds not only with the polymer but also, where desired, with oppositely-charged functional groups present on the surface of a substrate onto which the composition is coated. When there is substantially no attraction between polyelectrolyte and the substrate, the polyelectrolyte would only be functioning as a phase disrupter.

The polymer present in the latex is preferably a good film former and would ordinarily have a molecular weight of at least about 20,000. The polymer must be capable of being formed into an aqueous latex containing polymer particles of colloidal (submicron) size (or an organosol where such is employed). It is preferred that at least some of the functional groups be present in groups pendant from the polymer chain rather than just being terminal groups, in order to provide greater availability. Backbone unsaturation in the polymer is unnecessary but is acceptable.

Specific useful latices include styrene-butadiene-acrylic acid copolymers; methyl methacrylate-butyl acrylate-acrylamide copolymers; LUCIDENE-440 and LUCIDENE-361 (acrylic copolymers with acid functions available from Morton Chemical Co.); JONCRYL-M-74 and JONCRYL-85 (acrylic resins available from S. C. Johnson & Sons, Inc.; ACRYSOL I-94 (acrylic copolymer with acid functions available from Rohm & Haas); ethylene-vinyl-chloride-acrylic acid copolymers and ethylene-vinyl choride-acrylamide copolymers available from Air Products Co.; etc. Of interest, and to illustrate the point that the polymer need not be a primary film former at room temperature, polymers having glass transition temperatures at 30° C. are usable in the present invention under room temperature conditions. A preferred method for preparing the aqueous polymer latex is by emulsion polymerization. Proper control of the emulsion polymerization process permits the production of polymer particles of the proper size and charge—i.e., functionality.

Illustrative, but not-limiting, examples of suitable polymers for incorporation in the compositions of the present invention include sytrene-butadiene-acrylic acid copolymers. The acid functionality introduced by the acrylic acid could also be provided by other acidic or acid-generating monomers, such as methacrylic, maleic acid or anhydride, fumaric acid, maleic and fumaric half-esters, itaconic acid, citraconic acid and crotonic acid, acidic polymers derived from hydrolysis of maleic anhydride copolymers, acrylamide copolymers, acrylic esters and nitrile copolymers. Also an acid functionality could be provided by polymerization initiators, such as persulfate and permaleate compounds or by anionic emulsifiers, protective colloids, etc.

The precursor material is one which in its precursor form does not significantly disrupt the colloidal stability of the latex. Similarly, the polymer latex must be stable from the standpoint of not causing premature conversion of the precursor to the colloidal-disrupting and/or linking material. For example, residual catalyst or the like which could initiate polymerization of the precursor may have to be deactivated, as illustrated by Example 1 hereinafter.

Any suitable precursor capable of forming the colloid disrupting and/or linking material may be employed as long as it is capable of being dissolved or dispersed in water or in another solvent system where such is employed.

Examples of precursors for use with acid-bearing polymer latex materials include, for example, acrylic and methacrylic esters of amino alcohols and alkylamino alcohols, vinyl esters of amino acids, alkylamino acids, and oligomeric amides, vinyl pyridines, allyl amine, polyamines, alkylaminoalkyl compounds, maleimides, acrylamide, methacrylamide, n-vinylpyrrolidone, and combinations thereof. Further, specific examples of precursors forming polyelectrolyte or non-ionic material are N,N-dialkylaminoalkyl methacrylates and acrylates, N,N-dimethylaminoethyl methacrylate or acrylate, N,N-diethylaminoethyl methacrylate or acrylate, N-vinyl-2-pyrrolidone, dimethylaminopropyl methacrylate or acrylate, dimethylaminobutyl methacrylate or acrylate and the like. Obviously, some of the above precursors can also be used with polymer particles of basic functionality.

Examples of amine-bearing polymer polyelectrolyte and non-ionic bonding materials may be obtained by copolymerizing the above polymerizable amines with other vinyl monomers, such as stryene, isobutylene, ethylene, vinyl acetate, etc. Other amine-bearing polymers may be prepared by the various synthetic methods for introducing amino groups—e.g., the reaction of alkylaminoalkanol with maleic anhydride copolymers.

With aqueous polymer latex compositions in which the polymer is acid-bearing in terms of functionality, it has been found useful to employ amine-containing materials. For example, compounds comprising amino functionality connected to a vinyl or other polymerizable nucleus have been found useful, such as amino acrylates and methacrylates. While precursors such as the dialkylaminoalkyl methacrylates and acrylates polymerize to polyelectrolytes, other of the precursors, such as the N-vinylpyrrolidones, convert through polymerization to non-ionic polymers capable of forming hydrogen bonds through the nitrogen atom or through the carbonyl group, depending upon pH conditions, thus, acting as a weak Lewis acid or Lewis base in functionality.

Preferred substrate materials, where the aqueous polymer latex contains acid functionality include corona discharge-treated polyethylene, polypropylene and polyester. Where the aqueous polymer latex contains basic functionality, preferred substrates include acrylan, nylon, wool, cotton, etc.

In general, however, a wide variety of substrates may be coated with the compositions of the invention, including cellophane, coated foils, such as shellac or nitrocellulose-coated metal foils, chip-board, clay-coated board or white sulfite board, polystyrene, polyvinylchloride, glass, paper, etc.

The coating compositions of this invention will further preferably comprise a sensitizer capable of initiating the polymerization of the precursor to form the colloid disrupting and/or bonding material. UV sensitizers capable of initiating polymerization of the precursor upon exposure of UV irradiation could be used. Benzophenone tetracarboxylic dianhydride and other known benzophenone-type sensitizers are suitable for this purpose. Usually, ketones containing one or more aromatic rings, such as benzophenone, benzoin and its ethers, diethoxyacetophenone and dimethoxyacetophenone are used as UV sensitizers. The activated state of $\phi$—CO—$\phi$ is long-lived but does not dissociate readily into free radicals. φ—CO—φ can remove a hydrogen from suitably active donor materials to form a radical capable of initiating polymerization of ethers, such as THF and tert-amines, such as Me—N(C₂H₄OH)₂ or Me₂N—C₂H₄OH. Another way to initiate polymerization of the precursor is through the presence of a heat sensitizer, such as the peroxide and/or azo compound heat-sensitive sources of radical initiators. Combinations of UV-sensitive initiators and heat-sensitive initiators are operable. In addition, a non-radical thermal curing process alone, or in combination with UV and/or heat sensitizers, could be employed. The temperature required to activate a particular heat sensitizer, generally 45–50° C., will be known to the skilled artisan. Specific heat initiators useable are benzoyl peroxide and azobis-isobutyronitrile. Also, electron beam radiation could be used without sensitizers to initiate the polymerization of the precursor. Other electromagnetic radiation with appropriate sensitizers could also be useful in practicing this invention.

The compositions may also contain other conventional ingredients, such as stabilizers, reactive or non-reactive plasticizers, hardeners, pigments, etc.

The compositions find particular utility as ink binders or vehicles for the production of flexographic, gravure and other inks, especially for printing on foils and films, notably, corona discharge-treated or flame-treated polyolefins and polyesters. The compositions may be provided in a completely formulated condition or may be provided in a partially formulated condition to be worked up later by the ink manufacturer or other user by the addition of materials to aid in the dispersion of pigment, such as rosin resin and the addition of the pigment itself. The invention will be more fully appreciated in the light of the following detailed examples.

EXAMPLE 1

A. Emulsion Polymerization of Styrene-Butadiene-Acrylic Acid (1) First a solution of tetrasodium pyrophosphate was prepared by adding 6.9 g of Na₄P₂O₇.10 H₂O to 53.1 g of deionized and boiled water. The mixture was stirred and kept warm to dissolve the tetrasodium pyrophosphate. (2) The catalyst solution was prepared by adding 6.0 g of (NH₄)₂S₂O₈ to 54.0 g boiled and deionized water. (3) The following were then added to a container, capped and shaken thoroughly:

| | |
|---|---|
| 1.5 g | glacial acrylic acid |
| 69.0 g | boiled and deionized water |
| 7.8 g | surfactant - an ammonium salt of sulfated polyethoxyalkylphenol commercially available from GAF Corp., as Alipal EP-110 |
| 2.0 g | TSPP solution prepared in accordance with (1) above |
| 33.0 g | styrene monomer |
| 15.5 g | butadiene monomer |

(4) The container was placed in an empty tumble bath and rotated for 15 minutes at room temperature to assure uniform mixing.

(5) Rotation was stopped just long enough to inject 2.0 ml of catalyst solution prepared in accordance with (2) above, with a syringe through the cap of the container.

(6) Rotation in the empty tumble bath was resumed for another 15 minutes.

(7) Preheated water at 50° C. was added to the tumble bath while the container continued to be rotated and the bath temperature was maintained at this temperature for 18 hours with continued rotation.

(8) The bath was emptied and the container allowed to cool and was vented with a large hypodermic needle.

(9) A stabilizer solution was then added to the latex to kill the remaining catalyst. A stabilizer solution was prepared by using 0.2 g of sodium dithionite per 100 g of latex. The sodium dithionite is first dissolved in deionized water in a 1:10 ratio and is ready for use within a few minutes. The sodium dithionite solution is added drop wise to the well-stirred latex. The stabilizer should be added to the latex promptly after the emulsion polymerization is completed. The latex may then be strained to remove lumps, analyzed for pH and solids content and stored in containers purged with nitrogen.

B. Preparation of Un-Pigmented Stock Solution (1) There were combined in a covered container 0.70 g benzophenone tetracarboxylic dianhydride (BTDA), 1.00 g deionized water and 1.05 g methyl diethanolamine (MDEA). The BTDA does not dissolve too well in the aqueous latex, and the MDEA helps to solubilize the BTDA and may also serve as a co-sensitizer.

(2) The solution of (1) above was rotated on a mixing wheel until completely dissolved, usually within about 1 hour, and there was then added to it 35.0 g of the styrene-butadiene-acrylic acid latex prepared as described above. The mixture was then rotated on a mixing wheel for an additional hour to mix and equilibrate.

C. Preparing Coating Solution 5.0 g of stock solution was then mixed with 1.0 g dimethylaminoethyl methacrylate (MAME). The casting solution may then be coated on any suitable substrate, such as corona discharge-treated polyethylene, and exposed to an ultraviolet light source to bond the coating composition as a smooth, well-adhered film on the substrate.

USE OF EXAMPLE 1

The precise proportions of the monomers in the emulsion polymerization to produce copolymers containing the desired functionality is not critical, but, of course, there must be a sufficient amount of component to provide a level of functionality in the resulting polymer such that there are available sites to take part in the phase separation mechanism and/or for bonding or the like with, for example, the polyelectrolyte, to assure good bonding to the substrate.

The styrene-butadiene-acrylic acid copolymer latex formed by emulsion polymerization, as described in Example 1, produces proportions of about 66% styrene, 31% butadiene and 3% acrylic acid in the copolymer.

In preparing the stock solution using the emulsion polymerized aqueous polymer latex in combination with the UV or other sensitizer, the proportions again are not critical. However, the latices will ordinarily be employed at a solids concentration of about 40–50% and will normally make up about 90% or more of the stock solution. To this is added an aqueous solution of UV sensitizer, such as BTDA.

Without being limited to the proportions in the final coating or printing compositions, the most useful products would seem to be composed of from about 70 to about 95% of the stock solution, and the balance the precursor component.

Upon exposure to irradiation, the system exemplified above in Example 1 comprises an excess of polyelectrolyte-type bonding or linking component so that not only is the polymer rapidly coagulated but ionic bonds are rapidly formed between the latex particles and the oppositely-charged substrate in the event that the substrate is one possessing the required opposite charge for bonding with the polyelectrolyte.

In the styrene-butadiene-acrylic acid aqueous polymer latex described above, it has been found that the MAME polyelectrolyte precursor also serves as a wetting agent to assist in the smooth coating of the substrate by the coating solution or ink.

With respect to the concentration of precursor component in the testing solution or ink, there will be a trade-off of properties as the concentration is varied. For example, in the styrene-butadiene-acrylic acid system containing about 30% MAME, the pH is about 9–9.5, whereas in the same system with a concentration of about 5% MAME, the pH is lowered to about 8.5–9. The strength of bonding or adhesion also tends to decrease with a decrease in concentration of MAME. There is no observable effect in the systems tested to date, on the flexibility of the coating as the proportion of polymer and precursor component are varied. The economics of the system improve as the concentration of MAME is decreased because it is a relatively expensive component.

As noted above, there are many functional equivalents for the styrene-butadiene-acrylic acid system. For example, acrylic and methacrylic acid homopolymers should be operable. As noted above, in a preferred embodiment, the preference is for polymers with pendant carboxy functionality in side chain acid groups rather than terminal acid groups of polymer chains.

Although the present invention provides a quick-setting system, say the other of 0.05–5 minutes or less, ink film properties can often be further improved by subjecting the coated substrate to an immediate heat treatment, say the order of 35–100° C. The heat can aid solvent evaporation and can also accelerate the phase disruption and/or the linking mechanism.

EXAMPLE 2

A. Preparation of Blue Pigment Base

The following are combined and mixed in a blender:

| | |
|---|---|
| 36.0 g | ethanol |
| 171.0 g | water |
| 6.0 g | morpholine |
| 3.0 g | Foamaster "VL⇌ antifoam |
| 8.0 g | Pentalyn 269 (Hercules Incorporated) |

The mixture is poured into a 1-pint paint can, and there is added thereto:

| | |
|---|---|
| 60.0 g | Phthalocyanine Blue pigment 152-21 TGRF (Dianippon) and ¼ pint of BB's (copper clad steel shot, 77 cal.) |

Following suitable mixing, the shot is strained out and the pigment base is stored in a sealed container.

B. The pigmented stock solution is prepared by mixing equal portions of the pigment base and the unpigmented stock solution of Example 1. The pigmented stock solution can be mixed with the precursor component as in Example 1C to prepare a pigmented coating solution. 0.5 g of MAME can be used per 5 g of pigmented stock solutions. Other relative proportions of these components can be used.

C. Various other precursor components and combinations thereof were used to form pigmented coating solutions which were then coated on 2¾" by 3½" sections of corona discharge-treated polyethylene attached to glass casting blocks. UV irradiation was carried out using Model S/N apparatus manufactured by Illumination Industries Inc., Sunnyvale, Calif., with bulb No. BHG-1-B, a 1000 watt bulb manufactured by General Electric Co. Adhesion to the polyethylene was tested using clear scotch tape, with "adhesion value" indicating the amount of coating under the scotch tape that is not removed during the test. The testing results are tabulated in Table 1.

TABLE 1

| Test Card No. | Precursor Component, g/5 g Pig. Cast. Soln. | | | Irradiation Time, min. | Adhesion Value % |
|---|---|---|---|---|---|
| | MAME | VPD | EAA | | |
| 54 | 0.50 | — | — | 2 | 100% |
| 55 | 0.50 | 0.25 | — | 2 | 100% |
| 56 | 0.25 | 0.25 | — | 2 | 100% |
| 57 | 0.25 | 0.25 | — | 4 | 100% |
| 58 | 0.25 | 0.50 | — | 2 | 100% |
| 59 | — | 0.50 | — | 2 | 100% |
| 60 | 0.50 | — | — | 2 | 100% |
| 61 | — | — | 0.50 | 2 | 100% |

MAME = N,N—dimethylaminoethyl methacrylate
EAA = N,N—diethylaminoethyl acrylate
VPD = N—vinyl-2-pyrrolidone As discussed hereinbefore, the present invention can be tailored for use in any of a number of technical areas of importance, some of which will be illustrated below.

An important use of the present invention lies in the liquid ink field. UV- or other radiation-curable and/or heat-curable aqueous-based inks are particularly advantageous for flexographic printing on polyolefin, particularly polyethylene, surfaces.

The present invention can be used in any number of ways in the adhesive lamination field. The coating composition would probably be clear and contain a colloidal dispersion of polymeric adhesive particles which can inter-react with the material formed from the precursor component. For example, the clear casting solution as a lamination adhesive precursor is applied to a plastic film, say polyolefin—i.e., polyethylene—film. The sensitizing mechanism is then activated, say through UV irradiation where a UV sensitizer is employed for bonding. With the proper selection of latex polymer, the present system lends itself to the pressure-sensitive adhesive area. In this embodiment, the adhesive must be "sticky" after the curing step. Gelva multipolymer latices available from Monsanto Co. are examples of polymers useable in this embodiment.

In the floor covering area, a pigmented or non-pigmented latex could be applied at high solids content to the carpet backing, say corona-treated polypropylene, after the tufting operation, and then the curing step carried out depending upon the sensitizing system employed in the coating composition.

In an ink-related field, pigmented coating compositions of the present invention can be used as the vehicle in direct printing operations carried out on textiles. For example, with basic textiles, such as nylon or acrylic articles, a basic-type latex polymer could be employed with a precursor component convertible to an acidic-type bonding material.

As another possibility, the pigmented coating compositions could be used as metal decorating coatings—i.e., as automobile body paint where the curing would primarily be for a quick-drying or -setting paint. This would enable the painter to employ an aqueous system and then avoid organic solvent systems as paint vehicles. Of course, other types of latex paints could usefully employ this principle.

EXAMPLE 3

This example concerns textile printing vehicles. The pigmented casting solution of Example 2 was used to print on polyester fabric which had been corona discharge-treated and subsequently cured under ultraviolet light, also as described in Example 2.

EXAMPLE 4

This example concerns Carpet backing adhesives. Using the coating solution of Example 1, with sufficient clay filler to produce a solids content of 70%, an adhesive precursor is prepared for use as a binder between a carpet backing and the tufted fibers which have been pretreated by corona discharge.

EXAMPLE 5

This example concerns pressure-sensitive adhesives. A polymer latex having the composition of 66.5% 2-ethylhexyl acrylate, 32.5% vinyl acetate and 1.0% acrylic acid, was substituted for the styrene/butadiene/acrylic acid terpolymer latex in Example 1 to prepare an adhesive precursor which was applied to the corona discharge-treated polyethylene substrate and produce a quick-setting pressure adhesive upon exposure to ultraviolet light.

The above discussion is only illustrative and not limiting.

The embodiments of the invention in which an exclusive property or privilege is claimed are defined as follows:

1. A liquid coating composition comprising
   (a) colloidal polymer particles of at least one polymer capable of being deposited in the form of a film;
   (b) a precursor of a material capable of disrupting the colloidal stability of the polymer particles to cause film formation when the coating composition is applied to a substrate; and
   (c) a liquid dispersion medium.

2. The coating composition of claim 1 wherein said precursor (b) has an affinity for the polymer (a) and an affinity for said substrate, said precursor (b) being capable of acting an an adhesion-promoting linking agent between said polymer (a) and said substrate.

3. The coating composition of claim 1 in the form of an aqueous latex of the polymer particles.

4. The coating composition of claim 2 in the form of an aqueous latex of the polymer particles.

5. The coating composition of claim 3 wherein said precursor (b) is a polyelectrolyte.

6. The coating composition of claim 3 wherein said precursor (b) is a non-ionic polymer containing dipoles.

7. The coating composition of claim 3 wherein said precursor (b) is a non-ionic polymer capable of forming hydrogen bonds.

8. The coating composition of claim 1 inlcuding at least one of a UV sensitizer and a heat sensitizer.

9. The coating composition of claim 3 including at least one of a UV sensitizer and a heat sensitizer.

10. The coating composition of claim 4 including at least one of a UV sensitizer and a heat sensitizer.

11. The coating composition of claim 5 including at least one of a UV sensitizer and a heat sensitizer.

12. The coating composition of claim 7 including at least one of a UV sensitizer and a heat sensitizer.

13. The coating composition of claim 3 wherein the polymer (a) contains at least one of acid and basic functional groups.

14. The coating composition of claim 5 wherein the polymer (a) contains at least one of acid and basic functional groups.

15. The coating composition of claim 7 wherein the polymer (a) contains at least one of acid and basic functional groups.

16. The coating composition of claim 13 wherein said polymer (a) is an acrylic acid or methacrylic acid copolymer.

17. The coating composition of claim 14 wherein said polymer (a) is an acrylic acid or methacrylic acid copolymer.

18. The coating composition of claim 15 wherein said polymer (a) is an acrylic acid or methacrylic acid copolymer.

19. The coating composition of claim 13 wherein said precursor (b) is a polymerizable amine.

20. The coating composition of claim 14 wherein said precursor (b) is a polymerizable amine.

21. The coating composition of claim 15 wherein said precursor (b) is a polymerizable amine.

22. The coating composition of claim 19 wherein the polymerizable amine is selected from the group consisting of N,N-dialkylaminoalkyl acrylates, N,N-dialkylaminoalkyl methacrylates, N-vinyl pyrrolidones, acrylamide and methacrylamide.

23. The coating composition of claim 20 wherein the polymerizable amine is selected from the group consisting of N,N-dialkylaminoalkyl acrylates, N,N-dialkylaminoalkyl methacrylates, N-vinyl pyrrolidones, acrylamide and methacrylamide.

24. The coating composition of claim 21 wherein the polymerizable amine is selected from the group consisting of N,N-dialkylaminoalkyl acrylates, N,N-dialkylaminoalkyl methacrylates, N-vinyl pyrrolidones, acrylamide and methacrylamide.

25. The coating composition of claim 3 wherein the polymer (a) has at least one of acid and basic functional groups, said composition further containing at least one of a UV sensitizer and a heat sensitizer.

26. The coating composition of claim 5 wherein the polymer (a) has at least one of acid and basic functional groups, said composition further containing at least one of a UV sensitizer and a heat sensitizer.

27. The coating composition of claim 7 wherein the polymer (a) has at least one of acid and basic functional groups, said composition further containing at least one of a UV sensitizer and a heat sensitizer.

28. The coating composition of claim 25 wherein said UV sensitizer is a ketone containing one or more aromatic rings and said heat sensitizer is a peroxide or an azo free radical generating compound.

29. The coating composition of claim 26 wherein said UV sensitizer is a ketone containing one or more aromatic rings and said heat sensitizer is a peroxide or an azo free radical generating compound.

30. The coating composition of claim 27 wherein said UV sensitizer is a ketone containing one or more aromatic rings and said heat sensitizer is a peroxide or an axo free radical generating compound.

31. The coating composition of claim 28 wherein the precursor (b) is N,N-dimethylaminoethyl methacrylate, N,N-diethylaminoethyl acrylate, or N-vinyl-2-pyrrolidone.

32. The coating composition of claim 29 wherein the precursor (b) is N,N-dimethylaminoethyl methacrylate, or N,N-diethylaminoethyl acrylate.

33. The coating composition of claim 30 wherein the precursor (b) is N-vinyl-2-pyrrolidone.

34. A latex paint comprising a pigment and the coating composition of claim 3.

35. A metal decorating coating composition comprising the paint of claim 34.

* * * * *